(No Model.)  2 Sheets—Sheet 1.

W. EBERHARD.
GRAIN CUTTING MACHINE.

No. 283,981.  Patented Aug. 28, 1883.

Attest
Theodore Creighton
Geo. F. Robinson

Inventor
William Eberhard
by Bradford Howland
Attorney (No Model.) 2 Sheets—Sheet 2.

W. EBERHARD.
GRAIN CUTTING MACHINE.

No. 283,981. Patented Aug. 28, 1883.

Attest
Theodore Creighton
Geo. F. Robinson

Inventor
William Eberhard
by Bradford Howland
Attorney

UNITED STATES PATENT OFFICE.

WILLIAM EBERHARD, OF AKRON, OHIO, ASSIGNOR OF ONE-HALF TO GEORGE T. FORD, OF SAME PLACE.

GRAIN-CUTTING MACHINE.

SPECIFICATION forming part of Letters Patent No. 283,981, dated August 28, 1883.

Application filed June 20, 1883. (No model.)

*To all whom it may concern:*

Be it known that I, WILLIAM EBERHARD, a citizen of the United States, residing at Akron, in the county of Summit and State of Ohio, have invented a new and useful Improvement in Grain-Cutting Machines, of which the following is a specification.

My invention relates to grain-cutting machines in which oats and other grain are reduced to a coarse meal by means of a horizontally-rotating knife-carrier provided with inclined cutters which pass through similarly inclined grooves across the faces of cylinders that are grooved annularly to receive the kernels and conduct them down to the cutters, the cylinders being turned by the rotation of the knife-carrier with its inclined cutters.

Figure 1:
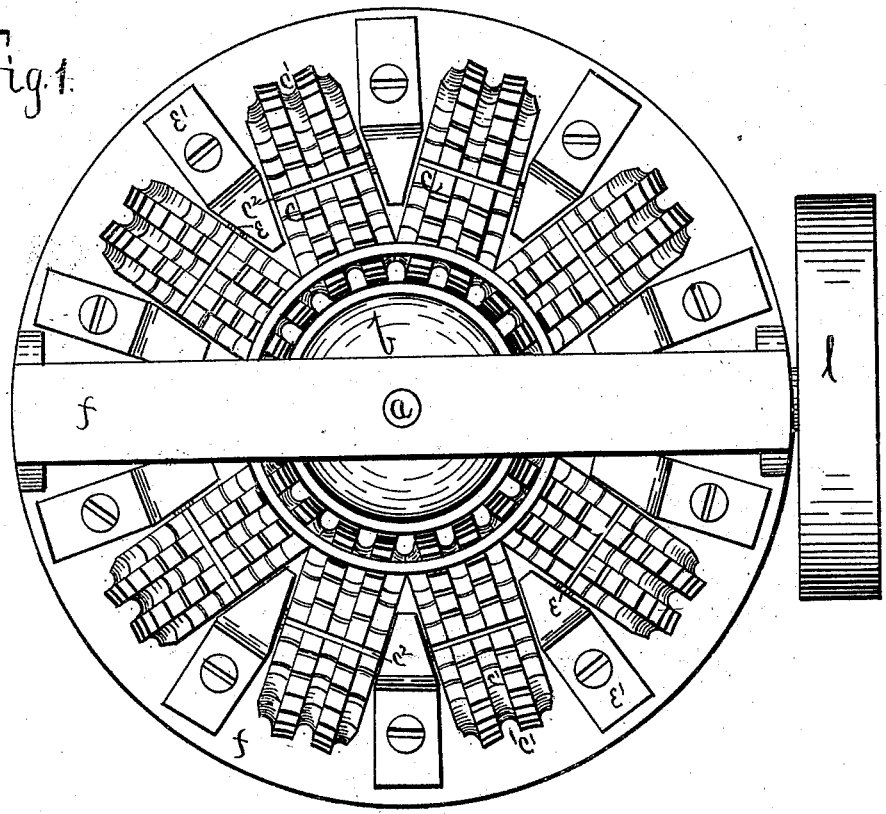
Figure 2:
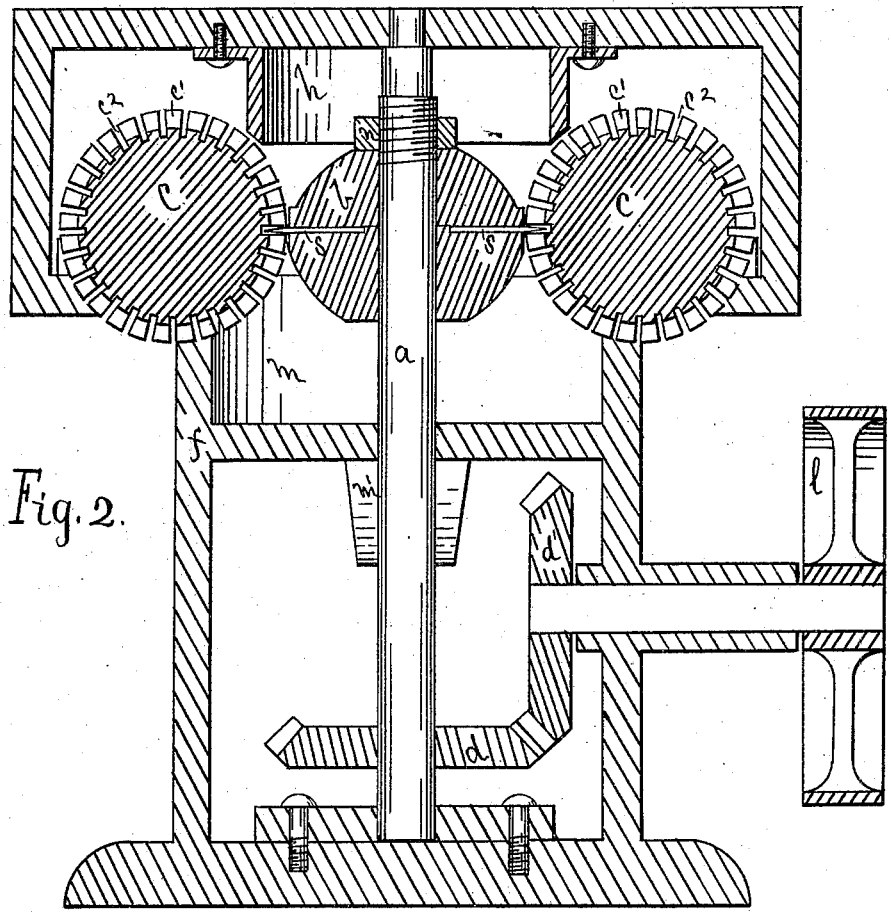
Figure 3:
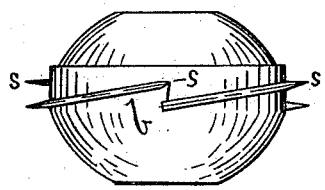

In the drawings forming a part of this specification, Figure 1 is a plan of the machine. Fig. 2 is a central vertical section of the same. Fig. 3 is a side elevation of the knife-carrier, and Fig. 4 is a plan of the lower part of the same.

The vertical shaft $a$ of knife-carrier $b$ and grooved cylinders $c$ are supported by a suitable frame, $f$. The peripheries of cylinders $c$ are formed with annular grooves $c'$ to receive the kernels of grain, and with inclined grooves $c^2$ across the face of a suitable width to permit cutters $s$ of carrier $b$ to enter them, but not wide enough to receive the kernels of grain. Cylinders $c$ have concave faces beveled at the sides, and are arranged on frame $f$ to form a complete circle around, and in close proximity to carrier $b$. Each cylinder $c$ turns on a single pintle, $e$, formed with a shank, $e'$, through which it is bolted to frame $f$. Carrier $b$ is provided with cutters $s$ set in an inclined position like screw-threads that pass through grooves $c^2$, and thereby turn cylinders $c$ in the same manner that they would be rotated by a worm-wheel. Carrier $b$ is formed in two sections with cutters $s$ held firmly between them by means of nut $n$. The lower section of carrier $b$ is shrunk on shaft $a$, or, if preferred, it may be keyed on the shaft. The edge of each cutter $s$ is inclined back to make a drawing cut in severing the kernels. The back of each cutter is below the edge of the next one as far as the width of the space between grooves $c^2$, in order that in the rotation of carrier $b$ each consecutive cutter $s$ will enter a groove $c^2$ above the one entered by the preceding cutter. The inclined cutters $s$ form gages on which the kernels stand on end while being severed.

Figure 4:
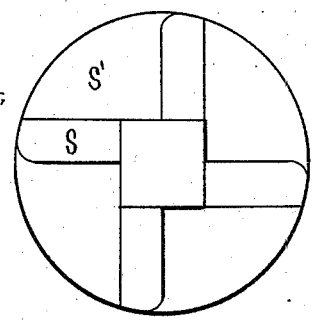

For convenience and economy in construction, instead of making cutter $s$ of one piece, I make it of a substantially rectangular form, as shown in Fig. 4, having a follower, $s'$, extending back beneath the edge of the next cutter. In this form the cutters may be moved out in adjusting them to compensate for wear after first loosening nut $n$ and raising the upper section of carrier $b$. Shaft $a$ is rotated by means of toothed wheels $d$ $d'$ and pulley $l$. Frame $f$ is formed with a cavity, $m$, to receive the meal, from which it is discharged through spout $m'$.

In operating the machine herein described the grain fed into hopper $h$ falls on carrier $b$, and the kernels entering grooves $c'$ endwise, rest on the upper side of cutters $s$ until severed by the next following cutters. The meal falls from the back of the cutter into cavity $m$.

I claim as my invention—

1. In a grain-cutting machine, a cylinder formed with annular grooves to receive the kernels and with inclined transverse grooves for the cutters, substantially as described.

2. In a grain-cutting machine, a cylinder formed with annular grooves and inclined transverse grooves, in combination with correspondingly-inclined cutters, substantially as described.

3. In a grain-cutting machine, a cylinder having a concave periphery grooved annularly and transversely, in combination with a rotating knife-carrier at right angles to the cylinder, substantially as described.

4. In a grain-cutting machine, a rotating knife-carrier, in combination with a series of annularly and transversely grooved cylinders arranged to form a circle around the carrier, substantially as described.

5. The knife-carrier $b$, provided with adjustable inclined cutters $s$ and followers $s'$, in combination with cylinder $c$, having a concave periphery grooved annularly and transversely, substantially as described.

WILLIAM EBERHARD.

Witnesses:
H. K. SAUDER,
O. W. HALE.